(12) United States Patent
Lian et al.

(10) Patent No.: US 12,434,566 B2
(45) Date of Patent: Oct. 7, 2025

(54) ELECTRIC DRIVE SYSTEM CONTROL METHOD, ELECTRIC DRIVE SYSTEM, AND VEHICLE

(71) Applicant: BYD COMPANY LIMITED, Guangdong (CN)

(72) Inventors: Yubo Lian, Shenzhen (CN); Heping Ling, Shenzhen (CN); Hua Pan, Shenzhen (CN); Yuxin Zhang, Shenzhen (CN); Zhao Xie, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 160 days.

(21) Appl. No.: 18/382,261

(22) Filed: Oct. 20, 2023

(65) Prior Publication Data
US 2024/0042868 A1  Feb. 8, 2024

Related U.S. Application Data

(63) Continuation of application No. PCT/CN2021/124717, filed on Oct. 19, 2021.

(30) Foreign Application Priority Data

Apr. 26, 2021 (CN) .......................... 202110455207.8

(51) Int. Cl.
*B60L 15/20* (2006.01)
(52) U.S. Cl.
CPC ......... *B60L 15/20* (2013.01); *B60L 2240/423* (2013.01); *B60L 2240/425* (2013.01)
(58) Field of Classification Search
CPC ............. B60L 15/20; B60L 2240/423; B60L 2240/425
See application file for complete search history.

(56) References Cited

U.S. PATENT DOCUMENTS 5,481,168 A * 1/1996 Mutoh .................. B60L 15/025
  318/432
7,586,286 B2 * 9/2009 Cheng ..................... H02P 23/30
  318/815

(Continued)

FOREIGN PATENT DOCUMENTS

| CN | 110995099 A | 4/2020 |
| CN | 111347938 A | 6/2020 |

(Continued)

OTHER PUBLICATIONS

International Search Report and Written Opinion for Application No. PCT/CN2021/124717, mailed on Jan. 27, 2022, 10 pages.

*Primary Examiner* — Gertrude Arthur Jeanglaude
(74) *Attorney, Agent, or Firm* — Sheppard Mullin Richter & Hampton LLP

(57) ABSTRACT

A method for controlling an electric drive system, includes: determining that the vehicle is in a traveling condition; obtaining a rotation speed value, a shaft end torque value, a present direct axis current value, and a present quadrature axis current value of the motor when receiving a vehicle heat-up demand signal; determining a target torque curve according to the shaft end torque value, and determining a target traveling heating calibration curve according to the vehicle heat-up demand signal and the rotation speed value; determining an intersection of the target torque curve and the target traveling heating calibration curve as a target traveling condition point; determining a target quadrature axis current value and a target direct axis current value according to the target traveling condition point; and controlling, according to the target direct axis current value and the target quadrature axis current value, the motor to operate.

20 Claims, 6 Drawing Sheets

(56) References Cited

U.S. PATENT DOCUMENTS

| | | | | |
|---|---|---|---|---|
| 7,969,138 B2* | 6/2011 | Sheahan | ............... | G01K 13/08 |
| | | | | 324/510 |
| 9,709,444 B2* | 7/2017 | Nozawa | ............... | B60W 20/50 |
| 10,594,242 B2* | 3/2020 | Eguchi | ............... | H02P 21/0089 |
| 11,394,330 B2* | 7/2022 | Wang | ..................... | H02P 23/28 |
| 2017/0257049 A1 | 9/2017 | Jing et al. | | |
| 2019/0154439 A1* | 5/2019 | Binder | ................... | G01S 15/42 |

FOREIGN PATENT DOCUMENTS

| | | | |
|---|---|---|---|
| CN | 111355432 A | 6/2020 | |
| CN | 111865183 A | 10/2020 | |
| CN | 111865184 A | 10/2020 | |
| CN | 111865185 A | 10/2020 | |
| CN | 112078378 A | 12/2020 | |
| CN | 112140900 A | 12/2020 | |
| CN | 112297868 A | 2/2021 | |
| CN | 112644339 A | 4/2021 | |
| CN | 112977094 A | 6/2021 | |
| EP | 2665179 A1 | 11/2013 | |
| JP | 2012213253 A | 11/2012 | |
| JP | 2014108682 A | 6/2014 | |
| WO | 2020194637 A1 | 10/2020 | |

* cited by examiner

ELECTRIC DRIVE SYSTEM CONTROL METHOD, ELECTRIC DRIVE SYSTEM, AND VEHICLE

CROSS-REFERENCE TO RELATED APPLICATIONS

This application is a Continuation Application of International Patent Application No. PCT/CN2021/124717, filed on Oct. 19, 2021, which is based on and claims priority to and benefits of Chinese Patent Application No. 202110455207.8, filed on Apr. 26, 2021. The entire content of all of the foregoing-referenced applications is incorporated herein by reference.

FIELD

The present disclosure relates to the technical field of vehicles, and particularly, to an electric drive system control method, an electric drive system, and a vehicle.

BACKGROUND

In the related art, when an electric drive system is used to improve the heating effect, the amount of waste heat of a motor is uncontrollable, and under the conditions where an ambient temperature is quite low, there is a situation where the utilization effect of the waste heat of the motor is poor, or the related art is mainly used in a scenario where a vehicle is in a stationary state. The application occasions are limited.

SUMMARY

Provided are an electric drive system control method, an electric drive system, and a vehicle, so as to implement control of a heat amount of waste heat of a motor and to be used in a traveling state.

In a first aspect, the present disclosure provides A method for controlling an electric drive system. The method is applied to an electric drive system of a vehicle. The electric drive system includes a motor and a motor controller. The method includes: determining that the vehicle is in a traveling condition according to a vehicle state parameter; in response to a vehicle heat-up demand signal, obtaining a rotation speed value, a shaft end torque value, a present direct axis current value, and a present quadrature axis current value of the motor; determining a target torque curve according to the shaft end torque value, and determining a target traveling heating calibration curve according to the vehicle heat-up demand signal and the rotation speed value, wherein the target torque curve characterizes the shaft end torque value by using a direct axis current value of the motor and a quadrature axis current value of the motor, and the target traveling heating calibration curve characterizes a heat generation amount of the electric drive system by using the direct axis current value of the motor and the quadrature axis current value of the motor; determining an intersection of the target torque curve and the target traveling heating calibration curve as a target traveling condition point; determining a target quadrature axis current value and a target direct axis current value according to the target traveling condition point, wherein a synthetic current vector amplitude value of the target quadrature axis current value and the target direct axis current value is greater than a synthetic current vector amplitude value of the present quadrature axis current value and the present direct axis current value; and controlling, according to the target direct axis current value and the target quadrature axis current value, the motor to operate.

In an embodiment of the present disclosure, when the vehicle is in the traveling condition, the target torque curve is determined according to the shaft end torque value of the motor, the target traveling heating calibration curve is determined according to the vehicle heat-up demand and the speed value or rotation speed value, the intersection of the target torque curve and the target traveling heating calibration curve is determined as the target traveling condition point, the target quadrature axis current value and the target direct axis current value are determined according to the target traveling condition point, and according to the target direct axis current value and the target quadrature axis current value, the motor is controlled to operate. The heat generation amount of the electric drive system can be dynamically adjusted in the traveling condition, and the target heating calibration curve is limited according to the speed of the motor. The feelings of occupants in different speed conditions can be met. The present disclosure is wide in the range of applications. In addition, the control method of this embodiment of the present disclosure can be implemented without changing hardware topology of the electric drive system, is easy to popularize, and has a low cost.

In a second aspect, the present disclosure provides an electric drive system, including: a motor and a motor controller; a current sensor, configured to acquire a three-phase current value of the motor; a position sensor, configured to acquire a position value of the motor; and a processor. The current sensor, the position sensor, and the motor controller are connected to the processor. The processor is configured to execute the method for controlling the electric drive system of the first aspect.

According to the electric drive system of this embodiment of the present disclosure, when the vehicle is in a traveling condition, the processor executes the method of the foregoing embodiments, so that the target torque curve is determined according to the shaft end torque value of the motor, the target traveling heating calibration curve is determined according to the vehicle heat-up demand and the speed value, the intersection of the target torque curve and the target traveling heating calibration curve is determined as the target traveling condition point, the target quadrature axis current value and the target direct axis current value are determined according to the target traveling condition point, and according to the target direct axis current value and the target quadrature axis current value, the motor is controlled to operate. The heat generation amount of the electric drive system can be dynamically adjusted in the traveling condition, and the target heating calibration curve is limited according to the speed of the motor. The feelings of occupants in different speed conditions can be met. The present disclosure is wide in the range of applications. In addition, the control method of this embodiment of the present disclosure can be implemented without changing hardware topology of the electric drive system, is easy to popularize, and has a low cost.

In a third aspect, the present disclosure provides a vehicle, including: a heating demand system and a vehicle control unit, where the vehicle control unit is configured to send a vehicle heat-up demand signal when determining that the heating demand system has a heat-up demand; and the electric drive system, where the electric drive system is connected to the vehicle control unit, and the electric drive system and the heating demand system form a heat conduction circuit.

According to the vehicle of the embodiments of the present disclosure, by using the electric drive system of the foregoing embodiments, the heat generation amount of the electric drive system can be dynamically adjusted in the traveling condition, and the target heating calibration curve is limited according to the speed of the motor. The feelings of occupants in different speed conditions can be met. The present disclosure is wide in the range of applications. In addition, the control method of this embodiment of the present disclosure can be implemented without changing hardware topology of the electric drive system, is easy to popularize, and has a low cost.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible from the following descriptions of the embodiments with reference to the accompanying drawings, where.

DETAILED DESCRIPTION

The embodiments of the present disclosure are described in detail below, and the embodiments described with reference to accompanying drawings are some of the embodiments of the present disclosure.

To resolve the problem that heating amount of the waste heat of an electric drive system is uncontrollable or is mainly applied to a vehicle in a stationary state, the embodiments of the first aspect of the present disclosure provide an electric drive system control method. By the control method, the heat generation amount of the electric drive system can be dynamically adjusted, and the temperature of a heating demand system of the vehicle, for example, a passenger compartment, a power battery, and other vehicle components, can be quickly increased, while maintaining the normal traveling of the vehicle. In addition, the control method of the embodiments of the present disclosure can be implemented without changing the general hardware topology of the electric drive system, and is easy to popularize and implement.

The electric drive system control method according to the present disclosure is described below with reference to FIG. 1 to FIG. 9.

Figure 1:
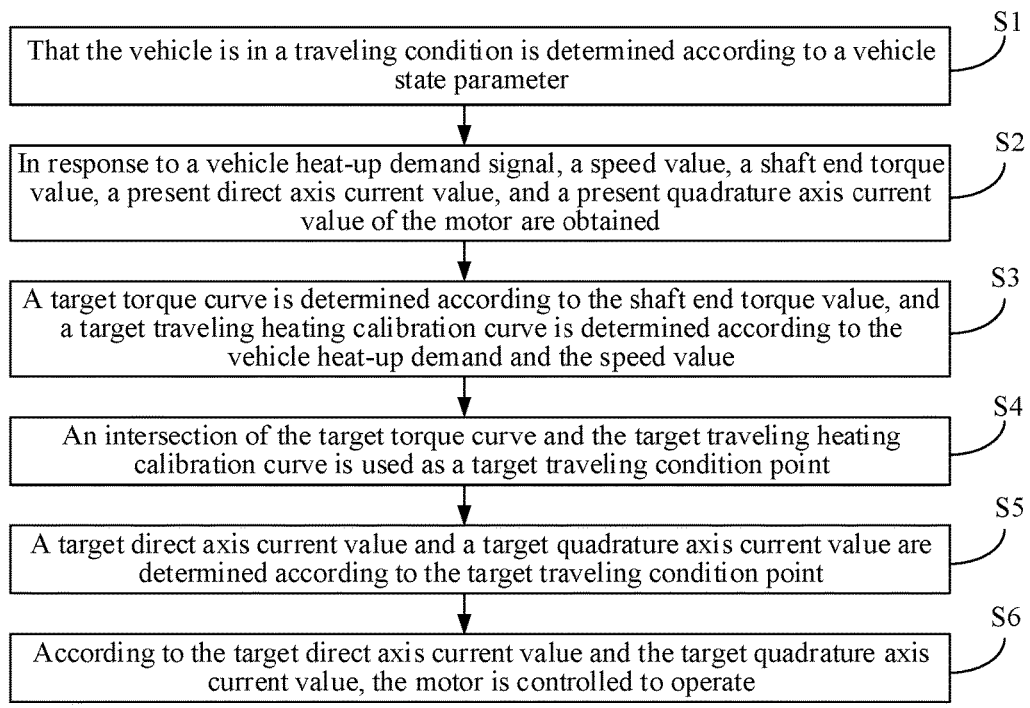
FIG. 1 is a flowchart of an electric drive system control method according to an embodiment of the present disclosure.

FIG. 1 is a flowchart of an electric drive system control method according to an embodiment of the present disclosure. As shown in FIG. 1, the control method according to this embodiment of the present disclosure includes at least steps S1 to S6 in the following.

S1: That the vehicle is in a traveling condition is determined according to a vehicle state parameter.

In some embodiments, the vehicle state parameter may include vehicle information such as a vehicle gear position, throttle information, and steering wheel information. A vehicle control unit determines a vehicle operating condition, for example, a traveling condition or a parking condition, based on the vehicle information.

Before the vehicle enters a heating adjustment stage of an electric drive system, the vehicle operates at a condition point A of an energy consumption calibration curve P1. Different condition points correspond to different combinations of direct axis current values and quadrature axis current values.

Figure 2:
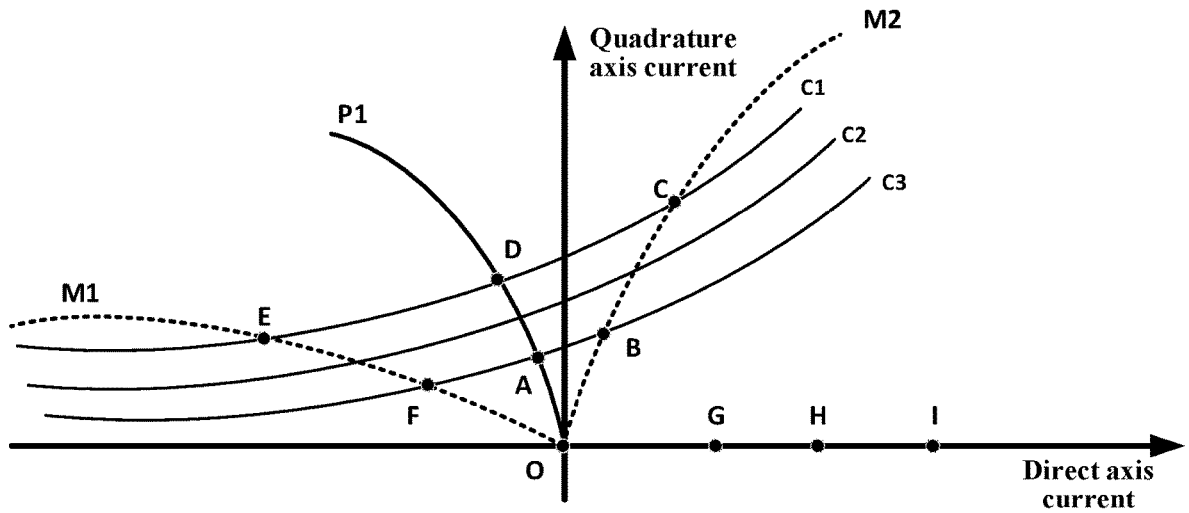
FIG. 2 is a schematic diagram of control of a quadrature-direct axis current combination of a motor according to an embodiment of the present disclosure.

The energy consumption calibration curve is an optimal curve that characterizes energy consumption by a direct axis current value of a motor and a quadrature axis current value of the motor. As shown in FIG. 2, the x-coordinate is the direct axis current of the motor, the y-coordinate is the quadrature axis current value of the motor, and P1 is a set of points having the lowest energy consumption when outputting identical torques.

S2: In response to a vehicle heat-up demand signal, a speed value or a rotation speed value, a shaft end torque value, a present direct axis current value, and a present quadrature axis current value of the motor are obtained.

In an embodiment, when the vehicle control unit determines that there is a vehicle heat-up demand according to a condition of a heating demand system, for example, a battery system, an air conditioning system, or a passenger compartment, of the vehicle, the vehicle control unit sends a vehicle heat-up demand signal to the electric drive system. The motor controller obtains the speed value, the shaft end torque value, the present direct axis current value, and the present quadrature axis current value of the motor. The speed value of the motor may be measured by a speed sensor. The shaft end torque value is obtained by directly measuring the shaft end torque value by a torque sensor or the shaft end torque value is obtained according to a torque allocated to the motor based on a required torque of the vehicle. A three-phase current value of the motor may be acquired by a current sensor. A position value of the motor is acquired by a position sensor. Then, the present direct axis current value and the present quadrature axis current value of the motor are obtained according to the three-phase current value and the position value.

The three-phase current value and the position value of the motor are correspondingly acquired in a space-time coordinate system. A corresponding direct axis current value and quadrature axis current value can be obtained through the coordinate transformation of the coordinate system.

In some embodiments, Clark transformation is performed according to the three-phase current value and the position value, to convert the three-phase current value into a two-phase stationary current value. The two-phase stationary current value is converted into a two-phase rotational current value through Park transformation. The two-phase rotational current value includes the present quadrature axis current value and the present direct axis current value.

S3: A target torque curve is determined according to the shaft end torque value, and a target traveling heating calibration curve is determined according to the vehicle heat-up demand and the speed value.

The target torque curve is a curve that characterizes the shaft end torque value by using a direct axis current value of the motor and a quadrature axis current value of the motor. The traveling heating calibration curve is a curve that characterizes a heat generation amount of the electric drive system by using the direct axis current value of the motor and the quadrature axis current value of the motor.

In an embodiment, as shown in FIG. 2, curves C1, C2, and C3 are torque curves, that is, a quadrature-direct axis current combination at any point on a same curve can output a same motor shaft end torque. Different torque curves represent different shaft end torque values of the motor. A curve closer to a zero point has a smaller value and farther from the zero point has a larger value. For example, in FIG. 2, a shaft end torque value of the motor corresponding to the torque curve C1>a shaft end torque value of the motor corresponding to the torque curve C2>a shaft end torque value of the motor corresponding to the torque curve C3. The torque curves can be calibrated and saved in advance. Therefore, during the adjustment of the electric drive system, the torque curve on which the motor operates (e.g., the target torque curve) can be determined based on the shaft end torque value of the motor.

In this embodiment, when determining the target traveling heating calibration curve according to the vehicle heat-up demand and the speed value, a target traveling heating calibration curve group is obtained according to the vehicle heat-up demand, and a target traveling heating calibration curve is determined from target traveling heating calibration curve group according to the speed value.

In this embodiment of the present disclosure, multiple traveling heating curves are calibrated and pre-stored. In a traveling condition, different heat generation amounts of the electric drive system correspond to different traveling calibration curve groups. Different traveling heating calibration curves are selected according to the different speed values, so as to meet the feelings of occupants in different speed conditions, for example, in a high-speed or slow-speed condition range.

For example, in some embodiments, speed thresholds are set to define different traveling heating curves corresponding to high-speed and low-speed conditions. As shown in FIG. 2, M1 is a first traveling heating calibration curve, and M2 is a second traveling heating calibration curve. The first traveling heating calibration curve and the second traveling heating calibration curve form a traveling heating calibration curve group. The traveling heating calibration curves may be obtained by calibration on a bench or the vehicle. M1 and M2 are a traveling heating calibration curve group corresponding to a particular heat generation amount of the electric drive system. In fact, there may be multiple traveling heating calibration curve groups similar to the group formed by M1 and M2. Two traveling heating calibration curves in a traveling heating calibration curve group correspond to a same heat generation amount of the electric drive system. When the speed value is greater than the speed threshold, the vehicle is in a high-speed condition, and it is determined that the first traveling heating calibration curve M1 is the target traveling heating calibration curve. A direct axis current value on the first traveling heating calibration curve M1 is less than 0, and a quadrature axis current value on the first traveling heating calibration curve M1 is greater than 0. When the speed value is less than or equal to the speed threshold, it is determined that the vehicle is in a low-speed condition, and it is determined that the second traveling heating calibration curve M2 is the target traveling heating calibration curve. A direct axis current value on the second traveling heating calibration curve M2 is greater than 0, and a quadrature axis current value on the second traveling heating calibration curve M2 is greater than 0.

S4: An intersection of the target torque curve and the target traveling heating calibration curve is used as a target traveling condition point.

As shown in FIG. 2, in a traveling condition, when the electric drive system is in a non-heating state, the vehicle is traveling at a particular condition point, for example, the condition point A in FIG. 2, of the energy consumption calibration curve P1. When the vehicle has a heat-up demand, in order to ensure stable and smooth operation of the vehicle, the shaft end torque value output by the motor is kept unchanged. The intersection of the target torque curve and the target traveling heating calibration curve is a condition point, for example, a condition point B or F, at which not only the present shaft end torque of the motor can be maintained, but also the vehicle heat-up demand can be met. Heating of the electric drive system is started. The motor is controlled to operate from the condition point A to the intersection B or F along the target torque curve, that is, step S5 is performed.

In some embodiments, when the present electric drive system is in a heating state, the vehicle travels at a point deviating from the energy consumption calibration curve, and the method is also applicable. The present direct axis current value and quadrature axis current value may be determined by using the three-phase current value and the position value of the motor.

S5: A target direct axis current value and a target quadrature axis current value are determined according to the target traveling condition point.

If a synthetic current vector amplitude value of the target quadrature axis current value and the target direct axis current value is greater than a synthetic current vector amplitude value of the present quadrature axis current value and the present direct axis current value, heating of the electric drive system is started, to increase a synthetic current vector amplitude value of the motor, and to increase the heat generation amount of the electric drive system.

In some embodiments, if the vehicle heat-up demand amount is equal to an amount of the electric drive system, that is, the vehicle heat-up demand is entirely completed by heat generation of the electric drive system, as shown in FIG. 2, the target quadrature axis current value and the target direct axis current value are a quadrature axis current value and a direct axis current value corresponding to the target traveling condition point. Therefore, the target quadrature axis current value and the target direct axis current value are used to control the heat production of the motor, so as to meet the vehicle heat-up demand.

Figure 3:
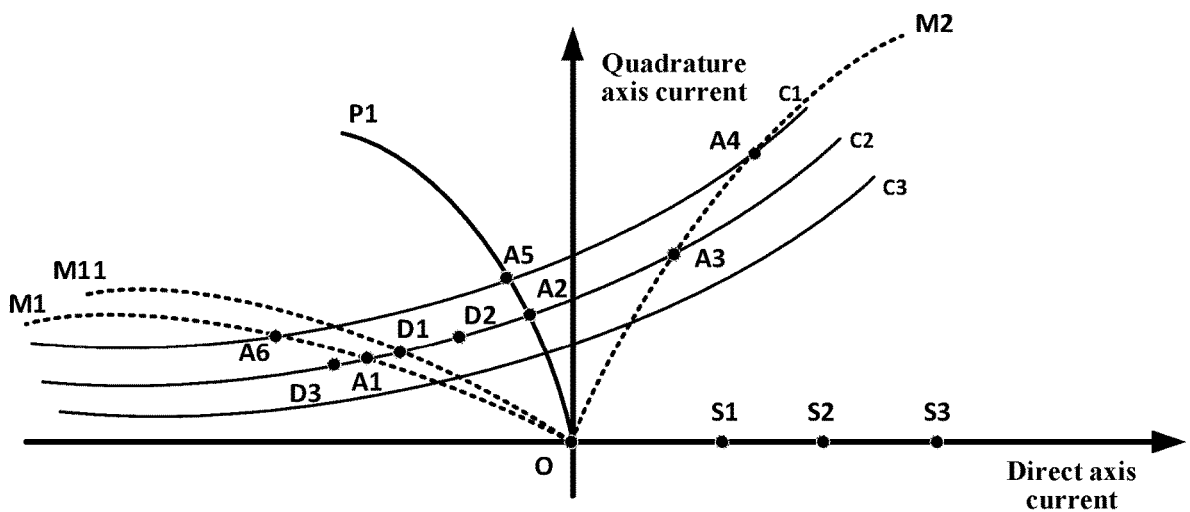
FIG. 3 is a schematic diagram of control of a quadrature-direct axis current combination of a motor according to another embodiment of the present disclosure.
Figure 4:
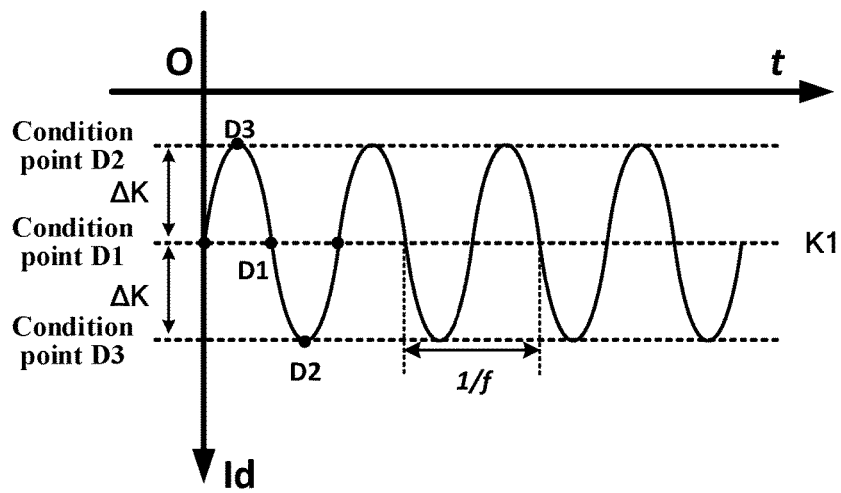
FIG. 4 is a change diagram of a direct axis current value corresponding to the embodiment shown in FIG. 3.

In other embodiments, as shown in FIG. 3 and FIG. 4, if the heat generation amount of the electric drive system corresponding to target traveling heating calibration curve is less than the vehicle heat-up demand amount, the obtaining a target direct axis current value and a target quadrature axis current value according to the target traveling condition point includes the following steps. A base point direct axis current value corresponding to the target traveling condition point is obtained. A preset change frequency and a current adjustment amplitude value are determined according to a difference between the heat generation amount of the electric drive system corresponding to the target traveling heating calibration curve and the vehicle heat-up demand amount. The base point direct axis current value is controlled to oscillate at the preset change frequency and the current adjustment amplitude value to serve as the target direct axis current value. The target quadrature axis current value is obtained according to the target direct axis current value and the shaft end torque of the motor. In this case, in addition to the heat generation amount of the electric drive system generated through the oscillation of the direct axis current value, a current flowing through a power battery also oscillates due to the oscillation of the direct axis current value, which can accelerate the heat generation rate of the power battery and enable the battery to perform self-heating. Therefore, the heat generated by the battery and the heat generated by the electric drive system can meet the vehicle heat-up demand. The method is suitable for a condition in which both a battery and a passenger compartment need to be heated, especially, for a condition in which a battery needs to quickly reach a particular working temperature. In this way, the self-heating of the battery can quickly increase the temperature.

As shown in FIG. 3, first, a ratio of the heat generation amount of the electric drive system to a heat generation amount of a battery is determined according to the vehicle heat-up demand, and a target traveling heating calibration curve M11 is determined according to the heat generation amount of the electric drive system and the speed value. In this case, the heat generation amount of the electric drive system corresponding to the target traveling heating calibration curve M11 is less than the vehicle heat-up demand amount. A base point direct axis current value D1 is determined according to the target traveling heating calibration curve M11 and the target torque curve C2. Then, a preset change frequency and a current adjustment amplitude value are determined according to a difference between the heat generation amount of the electric drive system corresponding to the target traveling heating calibration curve and the vehicle heat-up demand amount, so that the direct axis current value oscillates between D1, D2, and D3. Therefore, the heat generation amount of the electric drive system and the heat generation amount of the battery are increased.

For a same vehicle heat-up demand, if the battery is at an appropriate temperature, the vehicle heat-up demand amount can be directly determined as the heat generation amount of the electric drive system. Therefore, the target traveling heating calibration curve M1 is determined according to the vehicle heat-up demand amount and the speed value, and a base point direct axis current value A1 is determined according to the target traveling heating calibration curve M1 and the target torque curve C2.

The preset change frequency and the current adjustment amplitude value are determined according to the difference between the heat generation amount of the electric drive system corresponding to the target traveling heating calibration curve and the vehicle heat-up demand amount. A larger difference indicates a larger current adjustment amplitude value. On the contrary, a smaller difference indicates a smaller current adjustment amplitude value. The base point direct axis current value is controlled to oscillate at the preset change frequency and the current adjustment amplitude value to serve as the target direct axis current value. In addition, the target quadrature axis current value is obtained according to the target direct axis current value and the shaft end torque of the motor.

The controlling the base point direct axis current value to oscillate at the preset change frequency and the current adjustment amplitude value to serve as the target direct axis current value includes the following steps. A first direct axis current value and a second direct axis current value are obtained according to the base point direct axis current value. The target direct axis current value changes periodically at a preset transformation frequency by using the base point direct axis current value as a reference value, the first direct axis current value as a wave peak, and the second direct axis current value as a wave valley. The first direct axis current value is a sum of the base point direct axis current value and the current adjustment amplitude value. The second direct axis current value is a difference between the base point direct axis current value and the current adjustment amplitude value.

For example, in a sine wave, as shown in FIG. 4, the target direct axis current value uses the base point direct axis current value D1 as the reference value, the first direct axis current value D2 as the wave peak, and the second direct axis current value D3 as the wave valley. In other words, the target direct axis current value is an effective value oscillated by using the base point direct axis current value as the reference value at the preset transformation frequency and current adjustment amplitude value. It may be understood that a wave formed by controlling the base point direct axis current value to oscillate at the preset change frequency and current adjustment amplitude value may be a sine wave, or may be a square wave or another waveform formed through vibration in this way.

For example, if the base point direct axis current value corresponding to the target traveling condition point is K1, it is determined that the preset change frequency is f1, the current adjustment amplitude value is $\Delta K$, the first direct axis current value K11=K1+$\Delta K$, and the second direct axis current value K12=K1−$\Delta K$. The target direct axis current value periodically transforms by using K1 as the reference, f1 as a transformation frequency, and K1→K11→K1→K12→K1 as a cycle. Therefore, the heat generation amount of the electric drive system and the heat generation amount of the battery can be adjusted in an accelerated manner, so that the electric drive system of the vehicle can be suitable for cold regions, and the heat of the electric drive system can also be applied to thermal management of the vehicle.

When the difference between the heat generation amount of the electric drive system corresponding to the target traveling heating calibration curve and the vehicle heat-up demand amount becomes larger, the current adjustment amplitude value $\Delta K$ may be adjusted to increase. On the contrary, when the difference becomes smaller, the current adjustment amplitude value $\Delta K$ may be adjusted to decrease. K11 and K12 are obtained by using the adjusted current adjustment amplitude values. In addition, the target direct axis current value is obtained periodically in the foregoing manner, to meet an amount of demand for heat generation adjustment of the electric drive system.

S6: According to the target direct axis current value and the target quadrature axis current value, the motor is controlled to operate.

In some embodiments, after the target direct axis current value and the target quadrature axis current value of the motor are obtained, the present direct axis current value and the present quadrature axis current value of the motor are compared, then PI adjustment and feed-forward decoupling are performed to obtain a two-phase voltage signal, and a switch signal of the drive circuit is obtained through coordinate transformation and pulse width modulation. A switch signal is sent to the motor controller to control operation of the motor. Therefore, while the motor keeps the present shaft end torque unchanged, the synthetic current vector amplitude value of the motor is increased, the heat production of the motor is increased, and the heat generation amount of the electric drive system is increased.

In an embodiment, a difference calculation operation is performed between the target direct axis current value and the present direct axis current value, to obtain a direct axis current difference, and a difference calculation operation is performed between the target quadrature axis current value and the present quadrature axis current value, to obtain a quadrature axis current difference. Current closed-circuit adjustment is performed according to the direct axis current difference and the quadrature axis current difference, to obtain a direct axis voltage value and a quadrature axis voltage value. The direct axis voltage value and the quadrature axis voltage value are converted into a two-phase static voltage value through Park transformation. A bus voltage value of the electric drive system is obtained. Pulse width modulation is performed according to the bus voltage value and the two-phase static voltage value, to obtain a motor drive signal.

Therefore, while meeting normal traveling of the vehicle, the heat generation amount of the electric drive system is dynamically adjusted, to meet the demand of a vehicle heat-up demand module, for example, a passenger compartment a vehicle power battery, or other parts of the vehicle.

In some embodiments of the present disclosure, obtaining present heating power of the electric drive system according to a present condition of the vehicle may include looking up a table to obtain the present heating power according to a synthetic current vector variation of the motor at different speeds of the present vehicle. The table is calibrated in advance through simulation on the bench according to the electric drive system. Therefore, the calculation time required in an actual control process is reduced.

Figure 5:
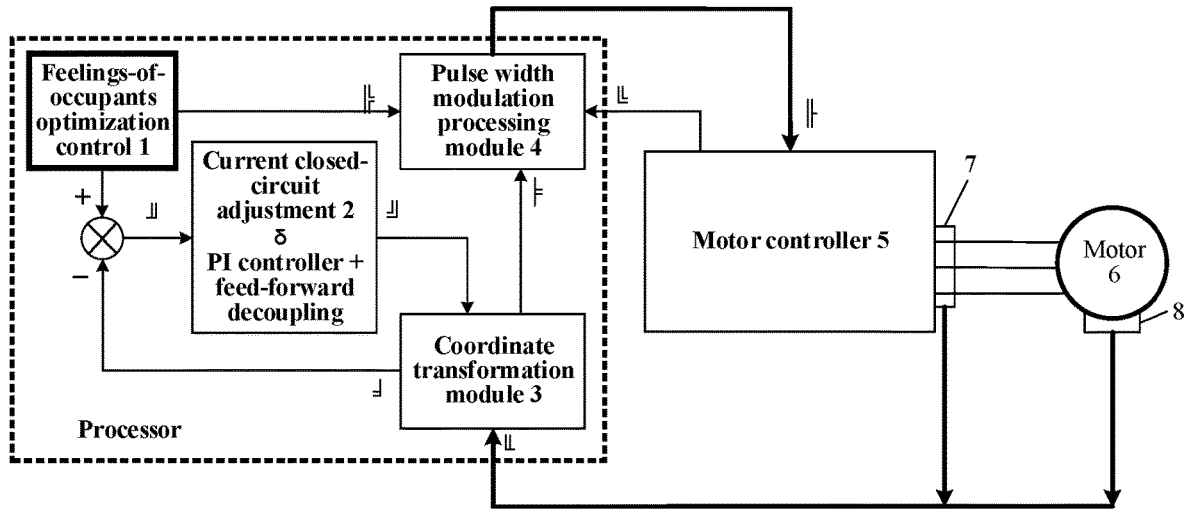
FIG. 5 is a control topology diagram of an electric drive system according to an embodiment of the present disclosure.

FIG. 5 is a control topology diagram of an electric drive system according to an embodiment of the present disclosure. By the method of this embodiment of the present disclosure, the hardware topology of the electric drive system does not need to be changed. The following describes the process of the control method of this embodiment of the present disclosure. In an embodiment, a current sensor 7 acquires a three-phase current value flowing between a motor controller 5 and a motor 6. A position sensor 8 acquires a real-time rotor position and a speed of the motor 6, and transmits same to a coordinate transformation processing module 3 through a path (1). The motor controller 5 synchronously acquires a bus voltage value of an electric control direct-current terminal of the electric drive system, and transmits same to a pulse width modulation processing module 4 through a path (2). A coordinate transformation module 3 converts a real-time three-phase static current into a real-time two-phase rotating current, that is, Iabc→Idq, through Clark transformation and Park transformation. The two-phase rotating current is compared, through a path (3), with a target quadrature-direct axis current value, that is, a dq axis current, output by a feelings-of-occupants optimization strategy 1, to obtain a two-phase rotating current difference. The feelings-of-occupants optimization strategy 1 means executing the foregoing steps S1 to S6, transmitting the obtained two-phase rotating current difference to a current closed-circuit adjustment module 2 through a path (4) for PI adjustment and feed-forward decoupling control, transmitting an output of the control, that is, the two-phase rotating voltage value, for example, a direct axis voltage value and a quadrature axis voltage value, to the coordinate transformation module 3 through a path (5), converting, through TPark transformation, a two-phase rotating voltage into a two-phase stationary voltage, that is, Udq→Uαβ, and transmitting same to a pulse width modulation module 4 through a path (6), so that the pulse width modulation module 4 transmits a generated switch signal to the motor controller 5 through a path (7), to control a power switch device in the motor drive circuit to turn on and off, so as to control the operation of the motor. The above are execution steps in a single operation cycle executed by the motor controller during heating of the electric drive system. In an actual operation process, the foregoing cycle may be repeated. Therefore, the quadrature-direct axis current combination of the motor is gradually adjusted from a particular condition point at which the combination does not enter the energy consumption curve during heating to the target traveling condition point, so that the heat production of the motor is increased, the heat generation amount of the electric drive system is increased, the heat-up demand of the electric drive system is met, and the feelings of occupants are improved.

On the basis of the foregoing control process of the electric drive system, the control method of this embodiment of the present disclosure mainly implements increase of the heat generation amount of the electric drive system through the feelings-of-occupants optimization strategy 1. As shown in FIG. 2, when the vehicle does not enter a stage in which the electric drive system has a heating adjustment demand, the vehicle operates at a particular condition point on the energy consumption calibration curve. If the vehicle determines, according to a demand of another module, for example, a battery or an air conditioning system, that the vehicle needs to start a heating adjustment function of the electric drive system, a present condition point at which the vehicle operates starts to move along the target torque curve in a direction of decreasing the direct axis current and decreasing the quadrature axis current, that is, both the quadrature and direct axis current values decrease and the synthetic current vector amplitude value increases; or, the motor current moves in a direction of increasing the direct axis current and increasing the quadrature axis current, that is, both the quadrature and direct axis current values increase and the s synthetic current vector amplitude value increases, until a present heat generation amount of the electric drive system reaches a target value, so that the heating adjustment demand of the electric drive system is met.

In some embodiments, upon detection of a change in the shaft end torque of the motor, a target torque curve is re-determined according to a changed shaft end torque of the motor. An intersection of the re-determined target torque curve and the target traveling heating calibration curve is obtained to serve as a new target traveling condition point. A quadrature axis current value and a direct axis current value of the new target traveling condition point are obtained as the target quadrature axis current value and the target direct axis current value. In addition, according to the foregoing process, a switch signal of the drive motor is generated to control operation of the motor, and dynamic adjustment of the electric drive system to the new target traveling condition point is implemented.

Referring to FIG. 2, for example, in a normal traveling condition, when a processor of the electric drive system receives a vehicle heat-up demand signal, the processor determines whether a present vehicle is in a parking condition or a traveling condition. If the present vehicle is in a traveling condition, the processor executes the feelings-of-occupants optimization strategy 1, to determine whether a present motor speed is greater than a speed threshold, where the speed threshold characterizes which traveling heating curve on which a present quadrature-direct axis current combination is, for example, if a present motor speed value is not greater than the speed threshold, the present quadrature-direct axis current combination may be on the first traveling heating calibration curve M1, and if the present motor speed value is greater than the speed threshold, the present quadrature-direct axis current combination may be only on the second traveling heating calibration curve M2. Assuming that the present vehicle operates at the condition point A on the energy consumption curve P1, and the present motor speed value is not greater than the speed threshold, the processor executes the feelings-of-occupants optimization strategy 1, to start adjusting the quadrature-direct axis current combination, so that its point moves from the condition point A to the condition point B along the torque curve C3. That is, the direct axis current value and the quadrature axis current value are increased. In this case, if a torque required by a wheel end of the vehicle increases, a required torque value at a corresponding shaft end of the motor increases, for example, to the value of the torque curve C1, and heating adjustment of the electric drive system still needs to be continued, the processor executes the feelings-of-occupants optimization strategy 1, to control the quadrature-direct axis current combination to move from the condition point B to the condition point C along the second traveling heating calibration curve M2. If the present motor speed value is greater than the speed threshold value, that is, the point of the quadrature-direct axis current combination cannot be on the second traveling heating calibration curve M2, the processor executes the feelings-of-occupants optimization strategy 1, to start to adjust the quadrature-direct axis current combination, so that its point moves from the condition point C, through a condition point D, to a condition point E along the torque curve C1. In this case, if a required torque at a wheel end of the vehicle decreases, a required torque value at a corresponding shaft end of the motor is the value of the torque curve C3, and heating adjustment of the electric drive system still needs to be continued, the processor executes the feelings-of-occupants optimization strategy 1, to control the quadrature-direct axis current combination to move from the condition point E to the condition point F along the first traveling heating calibration curve M1. Therefore, the dynamic adjustment of the heat generation amount of the electric drive system in a traveling condition is implemented, and the demand of the heat-up demand module of the vehicle is met.

In other embodiments, by the control method of this embodiment of the present disclosure, heating of the electric drive system when the vehicle is in a stationary state is optimized. In an embodiment, that the vehicle is in a parking condition is determined according to a vehicle state parameter. In response to the vehicle heat-up demand signal, a target parking condition point on a parking heating curve is determined according to the heat generation amount of the target electric drive. A direct axis current value corresponding to the target parking condition point is greater than 0 and a corresponding quadrature axis current value is greater than or equal to a first current threshold and less than a second current threshold.

In the embodiments, it is determined that the vehicle is in the parking condition when at least one of the following is met: a vehicle gear position is P gear; an electronic parking brake system is activated; the vehicle is in a vehicle parking charging condition in which the electric drive system is not reused for charging; a synthetic vector current of the direct axis current value and the quadrature axis current value of the motor is 0; a vehicle gear position is D gear, but the vehicle cannot move due to that a driver is stepping on a brake pedal.

A description is provided with reference to FIG. 2, if it is determined that the vehicle is in the parking condition, heating adjustment of the electric drive system needs to be performed, and the processor executes the feelings-of-occupants optimization strategy 1, to control the quadrature-direct axis current combination to move from a zero point O to a condition point G along a positive half-axis of the direct axis current. That is, the first current threshold is 0. In an embodiment, the quadrature axis current value is greater than 0 and less than the second current threshold, that is, the quadrature-direct axis current combination is controlled to follow a parallel line separated by a particular distance from the direct axis current. The separated distance is the second current threshold, and corresponds to a relatively small quadrature axis current value, which is not enough to drive the vehicle move, and only enables an output shaft of the motor to output a preload force to a transmission mechanism, to eliminate a meshing gap, so as to prevent the vehicle from shaking, but not to drive the vehicle. A larger required heat generation amount of the electric drive system indicates a farther distance by which the point of the quadrature-direct axis current combination is from a zero point O. As shown in FIG. 2, a heat generation amount of the electric drive system operating at a condition point I>a heat generation amount of the electric drive system operating at a condition point H>a heat generation amount of the electric drive system operating at the condition point G. An actual traveling process of the vehicle is relatively complicated, and the condition point at which the quadrature-direct axis current combination is located is selected comprehensively and adjusted dynamically according to the present traveling torque demand of the vehicle and the heating adjustment demand of the electric drive system.

Figure 6:
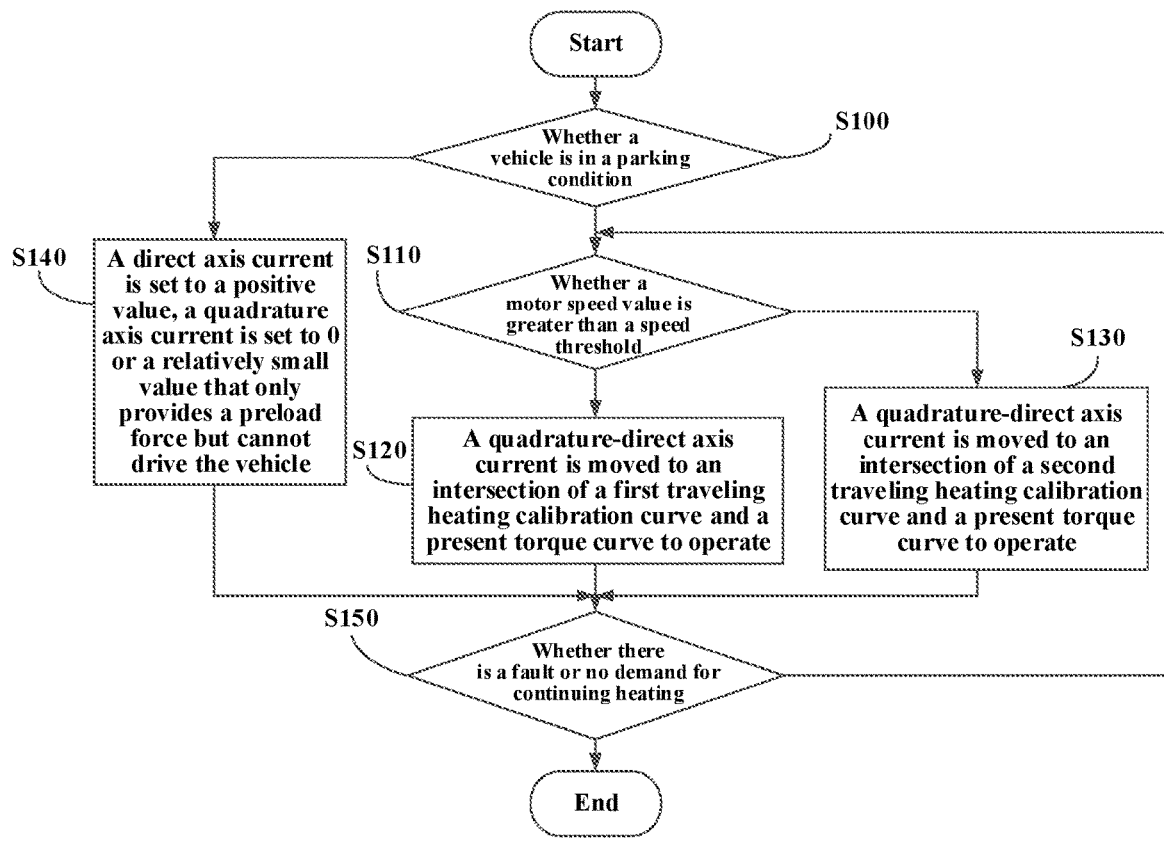
FIG. 6 is a flowchart of an electric drive system control method according to an embodiment of the present disclosure.

On the basis of the descriptions of the foregoing embodiments, FIG. 6 is a flowchart of an electric drive system control method according to an embodiment of the present disclosure. As shown in FIG. 6, the method includes the following steps.

S100: Whether a vehicle is in a parking condition is determined; if yes, step S140 is performed; and if not, that is, the vehicle is in a traveling condition, step S110 is performed.

S110: Whether a motor speed value is greater than a speed threshold is determined; if yes, step S120 is performed; or if not, step S130 is performed.

S120: A quadrature-direct axis current is moved to an intersection of a first traveling heating calibration curve and a present torque curve to operate, and step S150 is performed.

S130: A quadrature-direct axis current is moved to an intersection of a second traveling heating calibration curve and a present torque curve to operate, and step S150 is performed.

S140: A direct axis current is set to a positive value, a quadrature axis current is set to 0 or a relatively small value that only provides a preload force but cannot drive the vehicle, and step S150 is performed.

S150: Whether there is a fault or no demand for continuing heating is determined; if yes, end the process, or if not, step S100 is returned.

It should be noted that when the present motor speed is not greater than the speed threshold, on the basis of that the same heating adjustment demand of the electric drive system is met, the first traveling heating calibration curve M1 or the second traveling heating calibration curve M2 has a usable quadrature-direct axis current combination, and the processor executes the feelings-of-occupants optimization strategy 1, to optionally control the quadrature-direct axis current combination to be on the second traveling heating calibration curve M2.

Figure 7:
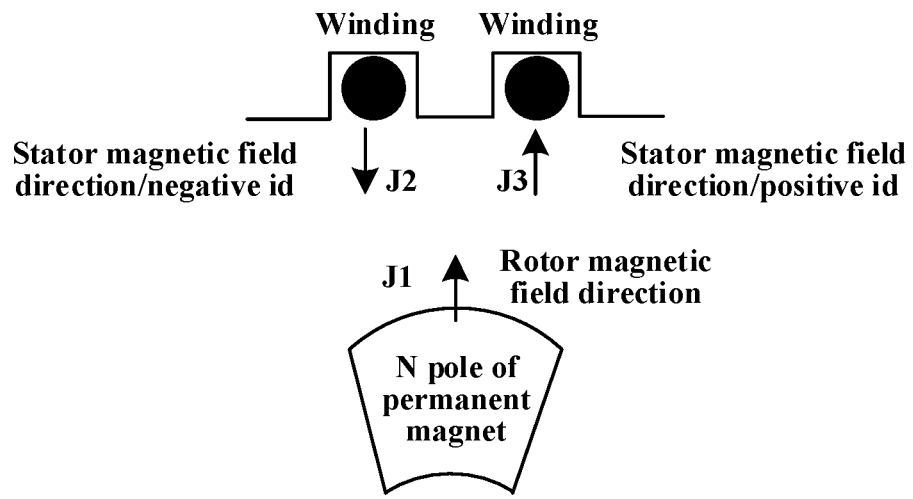
FIG. 7 is a schematic brief diagram of motor stator and rotor magnetic fields according to an embodiment of the present disclosure.

The reason may be referred to in the description with reference to FIG. 7. A conventional control method for a direct axis current vector is controlling the direct axis current vector to be a negative value, with the consideration of weakening a stator magnetic flux and further weakening a synthetic air gap magnetic flux, so that a permanent magnet synchronous motor can operate at a higher speed. In other words, simply, a stator magnetic field direction is opposite to a rotor magnetic field direction. The rotor magnetic field direction represented by an N pole of a permanent magnet is indicated by the arrow J1 below, a motor stator magnetic field direction is indicated by the arrow J2 on the upper left, and the forces between the two are interactive. If the vehicle is in a low-speed condition, the motor does not need to operate in a high-speed range. If the quadrature-direct axis current combination is controlled to be on the first traveling heating calibration curve M1 according to the heat-up demand of the electric drive system, that is, an excitation component opposite to a motor rotor magnetic field direction is relatively large and a control component of the motor torque is relatively small, the motor is prone to jitter. If the quadrature-direct axis current combination is controlled to be on the second traveling heating calibration curve M2 according to the heat-up demand of the electric drive system, the motor rotor magnetic field direction is indicated by an arrow J3 on the upper right in FIG. 7, and is consistent with the rotor torque direction, that is, an excitation component opposite to the motor rotor magnetic field direction is relatively small and a control component of the motor torque is relatively large, the motor is prone to jitter.

In some embodiments, the motor controller includes a power switch device, and when the target direct axis current value is greater than a limit, a carrier frequency of the power switch device fluctuates within a predetermined range.

Figure 8:
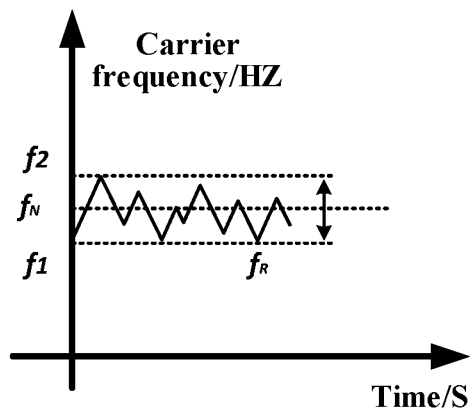
FIG. 8 is a change diagram of a carrier frequency of a power device over time according to an embodiment of the present disclosure.

In an embodiment, when the carrier frequency is unchanged, concentrated harmonic voltages and harmonic currents appear in the motor at a carrier frequency fN and an integer multiple frequency, and further electromagnetic interference and high frequency noise are generated. As shown in FIG. 8, it may be understood that the power switch device is turned on or off according to a motor drive signal. A time from a former on of the power switch device to an immediate subsequent on of the power switch device is one cycle. The carrier frequency is a reciprocal of the cycle. The predetermined range fluctuates from 90% of the present carrier frequency to 110% of the present carrier frequency. By using the carrier frequency control strategy, the harmonic voltages can be effectively distributed to a wider range of spectrum, the vibration and noise of the motor can be reduced, and the NVH performance of the vehicle can be optimized.

To sum up, by the control method of this embodiment of the present disclosure, based on the hardware topology of the electric drive shown in FIG. 5, by modifying a software control strategy, that is, through forward and reverse transition control of the direct axis current in FIG. 2, the heat generation amount of the electric drive system of a new energy vehicle is adjustable during normal traveling, and the feelings of occupants of the vehicle in a parking condition and a low-speed traveling conditions can be optimized.

Figure 9:
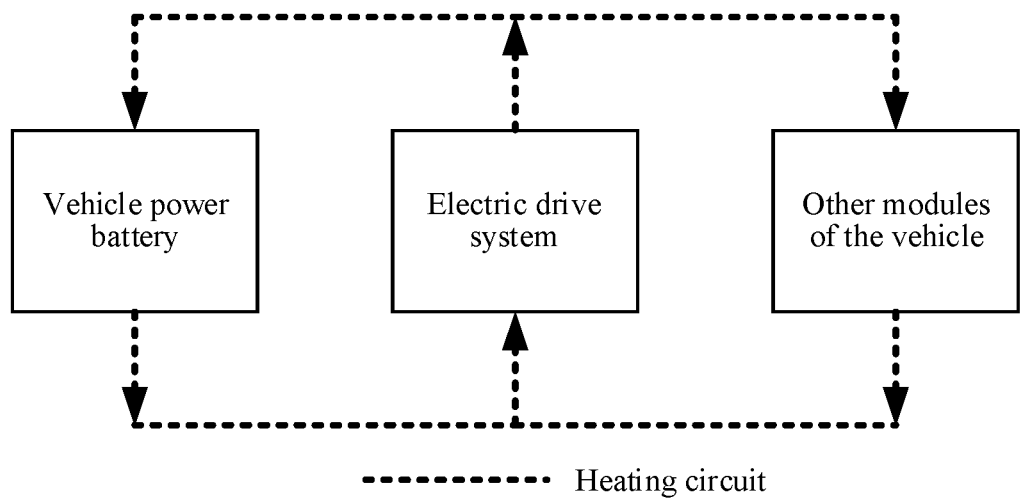
FIG. 9 is a schematic diagram of a heating circuit of an electric drive system according to an embodiment of the present disclosure.

In this embodiment, in the schematic diagram of heat conduction flowing directions of the heat generated by the electric drive system in FIG. 9, a heat conduction circuit of the vehicle communicates modules that may need heat of the vehicle. The heat conduction medium and the structure of the heat conduction circuit are not limited herein. More common modules include a vehicle power battery and other modules of the vehicle, and the other modules include, but are not limited to, a vehicle passenger compartment, an air conditioning system, and the like. When the vehicle puts forward a heat-up demand for the electric drive system, the electric drive system generates heat under the control of the software control strategy of the present patent. The heat passes through the heat conduction circuit, and the heat is optionally or simultaneously brought to the other modules of the vehicle or the vehicle power battery. The heat conduction flowing direction is determined according to an actual situation of the modules of the vehicle.

Based on the electric drive system control method of the foregoing embodiments, embodiments of a second aspect of the present disclosure provide an electric drive system. As shown in FIG. 9, an electric drive system 10 of this embodiment of the present disclosure includes a motor 6, a motor controller 5, a current sensor 7, a position sensor 8, and a processor 9.

The current sensor 7 is configured to acquire a three-phase current value of the motor 6. The position sensor 8 is configured to acquire a position value of the motor 6.

The current sensor 7, the position sensor 8, and the motor controller 5 are connected to the processor 9. The processor 9 is configured to execute the electric drive system control method in the foregoing embodiments. For an implementation process of the electric drive system control method, reference may be made to the descriptions of the foregoing embodiments, and details are not described herein again.

According to the electric drive system 10 of this embodiment of the present disclosure, when the vehicle is in a traveling condition, the processor 9 executes the electric drive system control method of the foregoing embodiments, so that the target torque curve is determined according to the shaft end torque value of the motor, the target traveling heating calibration curve is determined according to the vehicle heat-up demand and the speed value of the motor 6, the intersection of the target torque curve and the target traveling heating calibration curve is determined as the target traveling condition point, the target quadrature axis current value and the target direct axis current value are obtained according to the target traveling condition point, and according to the target direct axis current value and the target quadrature axis current value, the motor is controlled to operate. The heat generation amount of the electric drive system can be dynamically adjusted in the traveling condition, and the target heating calibration curve is limited according to the speed of the motor. The feelings of occupants in different speed conditions can be met. The present disclosure is wide in the range of applications. In addition, the control method of this embodiment of the present disclosure can be implemented without changing hardware topology of the electric drive system, is easy to popularize, and has a low cost.

Figure 10:
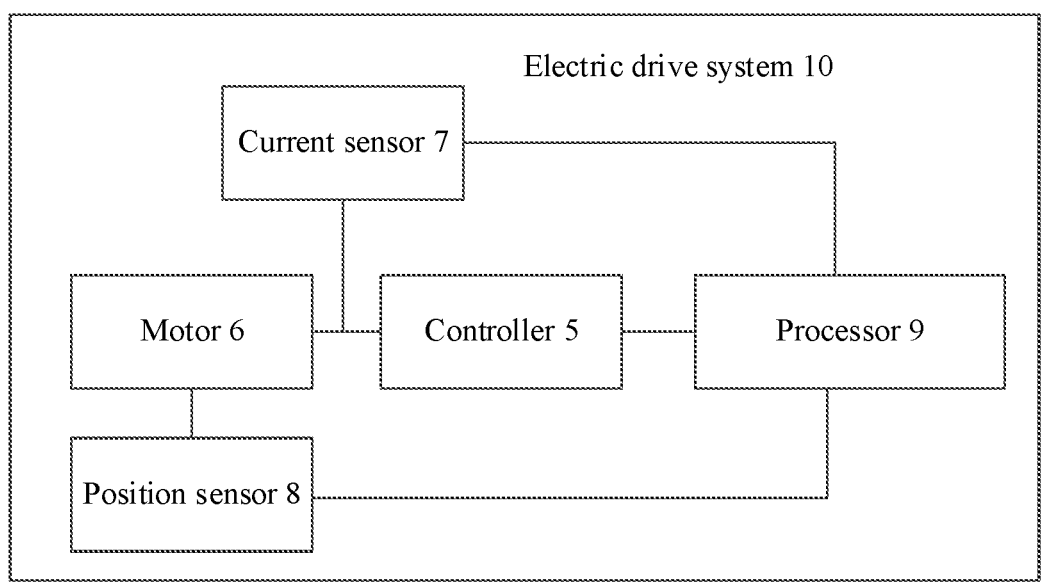
FIG. 10 is a block diagram of an electric drive system according to an embodiment of the present disclosure.
Figure 11:
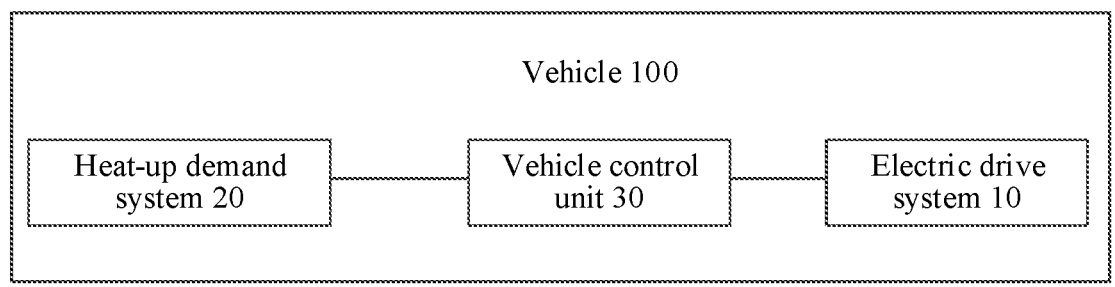
FIG. 11 is a block diagram of a vehicle according to an embodiment of the disclosure.

As shown in FIG. 10, a vehicle 100 of embodiments of a third aspect of the present disclosure includes a heating demand system 20, a vehicle control unit 30, and the electric drive system 10 of the foregoing embodiments. The vehicle control unit 30 is configured to send a vehicle heat-up demand signal when determining that the heating demand system 20, for example, a power battery or other vehicle modules, for example, an air conditioning system or a passenger compartment, has a heating adjustment demand for the electric drive system. The electric drive system 10 is connected to the vehicle control unit 30, and the electric drive system 10 and the heating demand system 20 form a heat conduction circuit, as shown in FIG. 11.

According to the vehicle 100 of the embodiments of the present disclosure, by using the electric drive system 10 of the foregoing embodiments, the heat generation amount of the electric drive system can be dynamically adjusted in the traveling condition, and the target heating calibration curve is limited according to the speed of the motor. The feelings of occupants in different speed conditions can be met. The present disclosure is wide in the range of applications. In addition, the control method of this embodiment of the present disclosure can be implemented without changing hardware topology of the electric drive system, is easy to popularize, and has a low cost.

In the description of this specification, the description of the reference terms such as "an embodiment", "some embodiments", "exemplary embodiments", "example", "specific example", or "some examples" means that the features, structures, materials or characteristics described with reference to the embodiment or example are included in at least an embodiment or example of the present disclosure. In this specification, exemplary descriptions of the foregoing terms do not necessarily refer to the same embodiment or example.

Although the embodiments of the present disclosure have been shown and described, a person of ordinary skill in the art should understand that: various changes, modifications, replacements and variations may be made to the embodiments without departing from the principles and spirit of the present disclosure, and the scope of the present disclosure is as defined by the appended claims and their equivalents.

What is claimed is:

1. A method for controlling an electric drive system, wherein the method is applied to an electric drive system of a vehicle, the electric drive system comprises a motor and a motor controller, and the method comprises:
   determining that the vehicle is in a traveling condition according to a vehicle state parameter;
   in response to a vehicle heat-up demand signal, obtaining a rotation speed value, a shaft end torque value, a present direct axis current value, and a present quadrature axis current value of the motor;
   determining a target torque curve according to the shaft end torque value, and determining a target traveling heating calibration curve according to the vehicle heat-up demand signal and the rotation speed value, wherein the target torque curve characterizes the shaft end torque value by using a direct axis current value of the motor and a quadrature axis current value of the motor, and the target traveling heating calibration curve characterizes a heat generation amount of the electric drive system by using the direct axis current value of the motor and the quadrature axis current value of the motor;
   determining an intersection of the target torque curve and the target traveling heating calibration curve as a target traveling condition point;
   determining a target quadrature axis current value and a target direct axis current value according to the target traveling condition point, wherein a synthetic current vector amplitude value of the target quadrature axis current value and the target direct axis current value is greater than a synthetic current vector amplitude value of the present quadrature axis current value and the present direct axis current value; and
   controlling, according to the target direct axis current value and the target quadrature axis current value, the motor to operate.

2. The method according to claim 1, wherein when a heat generation amount of the electric drive system corresponding to the target traveling heating calibration curve is equal to a vehicle heat-up demand amount, the determining a target quadrature axis current value and a target direct axis current value according to the target traveling condition point comprises:
   using the target quadrature axis current value and the target direct axis current value as a quadrature axis current value and a direct axis current value corresponding to the target traveling condition point.

3. The method according to claim 1, wherein when a heat generation amount of the electric drive system corresponding to the target traveling heating calibration curve is less than a vehicle heat-up demand amount, the determining a target direct axis current value and a target quadrature axis current value according to the target traveling condition point comprises:
   obtaining a base point direct axis current value corresponding to the target traveling condition point;
   determining a change frequency and a current adjustment amplitude value according to a difference between the heat generation amount of the electric drive system corresponding to the target traveling heating calibration curve and the vehicle heat-up demand amount;
   controlling the base point direct axis current value to oscillate at the change frequency and the current adjustment amplitude value to obtain the target direct axis current value; and
   obtaining the target quadrature axis current value according to the target direct axis current value and the shaft end torque value of the motor.

4. The method according to claim 3, wherein the controlling the base point direct axis current value to oscillate at the change frequency and the current adjustment amplitude value to obtain the target direct axis current value comprises:
   obtaining a first direct axis current value and a second direct axis current value according to the base point direct axis current value, and changing the target direct axis current value periodically at a transformation frequency by using the base point direct axis current value as a reference value, the first direct axis current value as a wave peak, and the second direct axis current value as a wave valley, wherein the first direct axis current value is a sum of the base point direct axis current value and the current adjustment amplitude value, and the second direct axis current value is a difference between the base point direct axis current value and the current adjustment amplitude value.

5. The method according to claim 3, wherein the difference between the heat generation amount of the electric drive system corresponding to the target traveling heating calibration curve and the vehicle heat-up demand amount indicates a current adjustment amplitude value, and a larger difference indicates a larger current adjustment amplitude value.

6. The method according to claim 1, wherein the determining a target traveling heating calibration curve according to the vehicle heat-up demand signal and the rotation speed value comprises:
obtaining a target traveling heating calibration curve group according to the vehicle heat-up demand signal, and determining the target traveling heating calibration curve from the target traveling heating calibration curve group according to the rotation speed value.

7. The method according to claim 6, wherein the obtaining a target traveling heating calibration curve group according to the vehicle heat-up demand signal, and determining the target traveling heating calibration curve from the target traveling heating calibration curve group according to the rotation speed value comprises:
obtaining a first traveling heating calibration curve and a second traveling heating calibration curve according to the vehicle heat-up demand signal, wherein the first traveling heating calibration curve and the second traveling heating calibration curve form the target traveling heating calibration curve group; and
in response to that the rotation speed value is greater than a speed threshold, determining the first traveling heating calibration curve as the target traveling heating calibration curve, wherein on the first traveling heating calibration curve, the direct axis current value is less than 0, and the quadrature axis current value is greater than 0; or in response to that the rotation speed value is less than or equal to the speed threshold, determining the second traveling heating calibration curve as the target traveling heating calibration curve, wherein on the second traveling heating calibration curve, the direct axis current value is greater than 0, and the quadrature axis current value is greater than 0.

8. The method according to claim 1, wherein the motor controller comprises a power switch device, and the method further comprises:
in response to that the target direct axis current value is greater than a limit, a carrier frequency of the power switch device fluctuates within a range.

9. The method according to claim 1, further comprising:
determining that the vehicle is in a parking condition according to the vehicle state parameter; and
in response to the vehicle heat-up demand signal, determining a target parking condition point on a parking heating curve according to a vehicle heat-up demand amount, wherein a direct axis current value corresponding to the target parking condition point is greater than 0, and a corresponding quadrature axis current value is greater than or equal to a first current threshold and less than a second current threshold.

10. The method according to claim 1, wherein the obtaining a present direct axis current value and a present quadrature axis current value of the motor comprises:
obtaining a three-phase current value and a position value of the motor;
performing Clark transformation according to the three-phase current value and the position value, to convert the three-phase current value into a two-phase stationary current value; and
converting the two-phase stationary current value into a two-phase rotational current value through Park transformation, wherein the two-phase rotational current value comprises the present quadrature axis current value and the present direct axis current value.

11. An electric drive system, comprising:
a motor and a motor controller;
a current sensor, configured to acquire a three-phase current value of the motor;
a position sensor, configured to acquire a position value of the motor; and
a processor, wherein the current sensor, the position sensor, and the motor controller are connected to the processor, and the processor is configured to execute a method for controlling the electric drive system, wherein the method comprises:
determining that a vehicle is in a traveling condition according to a vehicle state parameter;
in response to a vehicle heat-up demand signal, obtaining a rotation speed value, a shaft end torque value, a present direct axis current value, and a present quadrature axis current value of the motor;
determining a target torque curve according to the shaft end torque value, and determining a target traveling heating calibration curve according to the vehicle heat-up demand signal and the rotation speed value, wherein the target torque curve characterizes the shaft end torque value by using a direct axis current value of the motor and a quadrature axis current value of the motor, and the target traveling heating calibration curve characterizes a heat generation amount of the electric drive system by using the direct axis current value of the motor and the quadrature axis current value of the motor;
determining an intersection of the target torque curve and the target traveling heating calibration curve as a target traveling condition point;
determining a target quadrature axis current value and a target direct axis current value according to the target traveling condition point, wherein a synthetic current vector amplitude value of the target quadrature axis current value and the target direct axis current value is greater than a synthetic current vector amplitude value of the present quadrature axis current value and the present direct axis current value; and
controlling, according to the target direct axis current value and the target quadrature axis current value, the motor to operate.

12. The electric drive system according to claim 11, wherein when a heat generation amount of the electric drive system corresponding to the target traveling heating calibration curve is equal to a vehicle heat-up demand amount, the determining a target quadrature axis current value and a target direct axis current value according to the target traveling condition point comprises:
using the target quadrature axis current value and the target direct axis current value as a quadrature axis current value and a direct axis current value corresponding to the target traveling condition point.

13. The electric drive system according to claim 11, wherein when a heat generation amount of the electric drive system corresponding to the target traveling heating calibration curve is less than a vehicle heat-up demand amount, the determining a target direct axis current value and a target quadrature axis current value according to the target traveling condition point comprises:

obtaining a base point direct axis current value corresponding to the target traveling condition point;

determining a change frequency and a current adjustment amplitude value according to a difference between the heat generation amount of the electric drive system corresponding to the target traveling heating calibration curve and the vehicle heat-up demand amount;

controlling the base point direct axis current value to oscillate at the change frequency and the current adjustment amplitude value to obtain the target direct axis current value; and obtaining the target quadrature axis current value according to the target direct axis current value and the shaft end torque value of the motor.

14. The electric drive system according to claim 13, wherein the controlling the base point direct axis current value to oscillate at the change frequency and the current adjustment amplitude value to obtain the target direct axis current value comprises:

obtaining a first direct axis current value and a second direct axis current value according to the base point direct axis current value, and changing the target direct axis current value periodically at a transformation frequency by using the base point direct axis current value as a reference value, the first direct axis current value as a wave peak, and the second direct axis current value as a wave valley, wherein the first direct axis current value is a sum of the base point direct axis current value and the current adjustment amplitude value, and the second direct axis current value is a difference between the base point direct axis current value and the current adjustment amplitude value.

15. The electric drive system according to claim 13, wherein the difference between the heat generation amount of the electric drive system corresponding to the target traveling heating calibration curve and the vehicle heat-up demand amount indicates a current adjustment amplitude value, and a larger difference indicates a larger current adjustment amplitude value.

16. A vehicle, comprising:

a heating demand system and a vehicle control unit, wherein the vehicle control unit is configured to send a vehicle heat-up demand signal when determining that the heating demand system has a heat-up demand; and an electric drive system, wherein the electric drive system is connected to the vehicle control unit, and the electric drive system and the heating demand system form a heat conduction circuit, wherein the electric drive system comprises:

a motor and a motor controller;

a current sensor, configured to acquire a three-phase current value of the motor;

a position sensor, configured to acquire a position value of the motor; and a processor, wherein the current sensor, the position sensor, and the motor controller are connected to the processor, and the processor is configured to execute a method for controlling the electric drive system, wherein the method comprises:

determining that the vehicle is in a traveling condition according to a vehicle state parameter;

in response to the vehicle heat-up demand signal, obtaining a rotation speed value, a shaft end torque value, a present direct axis current value, and a present quadrature axis current value of the motor;

determining a target torque curve according to the shaft end torque value, and determining a target traveling heating calibration curve according to the vehicle heat-up demand signal and the rotation speed value, wherein the target torque curve characterizes the shaft end torque value by using a direct axis current value of the motor and a quadrature axis current value of the motor, and the target traveling heating calibration curve characterizes a heat generation amount of the electric drive system by using the direct axis current value of the motor and the quadrature axis current value of the motor;

determining an intersection of the target torque curve and the target traveling heating calibration curve as a target traveling condition point;

determining a target quadrature axis current value and a target direct axis current value according to the target traveling condition point, wherein a synthetic current vector amplitude value of the target quadrature axis current value and the target direct axis current value is greater than a synthetic current vector amplitude value of the present quadrature axis current value and the present direct axis current value; and controlling, according to the target direct axis current value and the target quadrature axis current value, the motor to operate.

17. The vehicle according to claim 16, wherein when a heat generation amount of the electric drive system corresponding to the target traveling heating calibration curve is equal to a vehicle heat-up demand amount, the determining a target quadrature axis current value and a target direct axis current value according to the target traveling condition point comprises:

using the target quadrature axis current value and the target direct axis current value as a quadrature axis current value and a direct axis current value corresponding to the target traveling condition point.

18. The vehicle according to claim 16, wherein when a heat generation amount of the electric drive system corresponding to the target traveling heating calibration curve is less than a vehicle heat-up demand amount, the determining a target direct axis current value and a target quadrature axis current value according to the target traveling condition point comprises:

obtaining a base point direct axis current value corresponding to the target traveling condition point;

determining a change frequency and a current adjustment amplitude value according to a difference between the heat generation amount of the electric drive system corresponding to the target traveling heating calibration curve and the vehicle heat-up demand amount;

controlling the base point direct axis current value to oscillate at the change frequency and the current adjustment amplitude value to obtain the target direct axis current value; and obtaining the target quadrature axis current value according to the target direct axis current value and the shaft end torque value of the motor.

19. The vehicle according to claim 18, wherein the controlling the base point direct axis current value to oscillate at the change frequency and the current adjustment amplitude value to obtain the target direct axis current value comprises:

obtaining a first direct axis current value and a second direct axis current value according to the base point direct axis current value, and changing the target direct axis current value periodically at a transformation frequency by using the base point direct axis current value as a reference value, the first direct axis current value as a wave peak, and the second direct axis current value as a wave valley, wherein the first direct axis current value is a sum of the base point direct axis current value and the current adjustment amplitude value, and the second direct axis current value is a difference between the base point direct axis current value and the current adjustment amplitude value.

20. The vehicle according to claim 18, wherein the difference between the heat generation amount of the electric drive system corresponding to the target traveling heating calibration curve and the vehicle heat-up demand amount indicates a current adjustment amplitude value, and a larger difference indicates a larger current adjustment amplitude value.

* * * * *